US007680993B2

(12) United States Patent
Dougall

(10) Patent No.: US 7,680,993 B2
(45) Date of Patent: Mar. 16, 2010

(54) LOCAL DIGITAL ASSET STORAGE MANAGEMENT TECHNIQUE

(75) Inventor: Scott C. J. Dougall, Burbank, CA (US)

(73) Assignee: Tandberg Television, Inc., Duluth, GA (US)

( * ) Notice: Subject to any disclaimer, the term of this patent is extended or adjusted under 35 U.S.C. 154(b) by 542 days.

(21) Appl. No.: 11/644,601

(22) Filed: Dec. 21, 2006

(65) Prior Publication Data

US 2008/0154961 A1    Jun. 26, 2008

(51) Int. Cl.
G06F 13/00 (2006.01)
H04N 7/00 (2006.01)
(52) U.S. Cl. .................. 711/159; 725/145; 725/151
(58) Field of Classification Search ............ 711/159; 707/104.1; 725/145, 151
See application file for complete search history.

(56) References Cited

U.S. PATENT DOCUMENTS

| 5,510,905 | A |   | 4/1996  | Birk           |        |
|-----------|---|---|---------|----------------|--------|
| 5,548,532 | A |   | 8/1996  | Menand et al.  |        |
| 5,657,461 | A |   | 8/1997  | Harkins et al. |        |
| 5,664,091 | A |   | 9/1997  | Keen           |        |
| 5,790,935 | A | * | 8/1998  | Payton         | 725/91 |
| 5,801,747 | A |   | 9/1998  | Bedard         |        |
| 5,844,620 | A |   | 12/1998 | Coleman et al. |        |

(Continued)

FOREIGN PATENT DOCUMENTS

WO    WO-03-024036    3/2003

OTHER PUBLICATIONS

Schurman, Kyle, How to . . . Compress hard drives, Apr. 1999, Smart Computing, vol. 5, Iss. 4.*

(Continued)

*Primary Examiner*—Pierre-Michel Bataille
*Assistant Examiner*—Michael C Krofcheck
(74) *Attorney, Agent, or Firm*—Evan L. Kahn; Proskauer Rose LLP

(57) ABSTRACT

A technique is described for managing the local storage of digital assets, such as audio, (moving or still) pictures, text, executable code and combinations thereof, in the storage device of a user appliance, such as a personal video recorder, set top box, mobile phone or storage server. A digital asset is received that is intended for local storage in the storage device and that has been pushed down from a source. A rank order is assigned to each digital asset stored or to be stored in a storage device that has a finite capacity storage space for storing digital assets. The assigned rank orders of one or more of the digital assets are repeatedly examined and a digital asset having a rank order that is lowest among the examined rank orders may be deleted. Each rank order is assigned based on predefined default ranking rules and user instructions pertaining to one or more of the digital assets that are capable of causing a deviation from the default ranking rules, if any have been provided by the user. A signal may be provided containing executable instructions that can be executed at programmable electronic circuits for performing the above steps. Such a signal may be stored on a storage medium. A system for performing the above steps may include a receiver for receiving the digital assets and a processor for assigning ranking orders and for repeatedly examining the ranking orders and selectively deleting digital assets with low ranking orders.

15 Claims, 4 Drawing Sheets

U.S. PATENT DOCUMENTS

| | | | | |
|---|---|---|---|---|
| 5,852,606 | A | 12/1998 | Prince et al. | |
| 5,920,700 | A * | 7/1999 | Gordon et al. | 709/226 |
| 5,946,326 | A | 8/1999 | Rinne | |
| 5,991,912 | A | 11/1999 | Mao | |
| 6,005,565 | A | 12/1999 | Legall et al. | |
| 6,016,507 | A | 1/2000 | Carroll et al. | |
| 6,021,516 | A | 2/2000 | Okajima et al. | |
| 6,055,564 | A | 4/2000 | Phaal | |
| 6,101,547 | A | 8/2000 | Mukherjee et al. | |
| 6,112,323 | A | 8/2000 | Meizlik et al. | |
| 6,148,330 | A | 11/2000 | Puri et al. | |
| 6,151,636 | A | 11/2000 | Schuster et al. | |
| 6,205,485 | B1 | 3/2001 | Kikinis | |
| 6,240,105 | B1 | 5/2001 | Zetts | |
| 6,272,547 | B1 | 8/2001 | McWilliams | |
| 6,289,464 | B1 | 9/2001 | Wecker et al. | |
| 6,321,250 | B1 | 11/2001 | Knape et al. | |
| 6,339,595 | B1 | 1/2002 | Rekhter et al. | |
| 6,389,471 | B1 | 5/2002 | Agraharam et al. | |
| 6,401,242 | B1 | 6/2002 | Eyer et al. | |
| 6,415,312 | B1 | 7/2002 | Boivie | |
| 6,434,621 | B1 | 8/2002 | Pezzillo et al. | |
| 6,438,108 | B1 | 8/2002 | Kanljung et al. | |
| 6,442,598 | B1 | 8/2002 | Wright et al. | |
| 6,449,632 | B1 | 9/2002 | David et al. | |
| 6,483,548 | B1 | 11/2002 | Allport | |
| 6,493,688 | B1 | 12/2002 | Das et al. | |
| 6,501,741 | B1 | 12/2002 | Mikkonen et al. | |
| 6,512,768 | B1 | 1/2003 | Thomas | |
| 6,518,986 | B1 | 2/2003 | Mugura | |
| 6,546,427 | B1 | 4/2003 | Ehrlich et al. | |
| 6,577,806 | B1 | 6/2003 | Hirota | |
| 6,587,457 | B1 | 7/2003 | Mikkonen | |
| 6,601,103 | B1 | 7/2003 | Goldschmidt Lki et al. | |
| 6,633,538 | B1 | 10/2003 | Tanaka et al. | |
| 6,637,029 | B1 | 10/2003 | Maissel et al. | |
| 6,675,385 | B1 | 1/2004 | Wang | |
| 6,681,395 | B1 | 1/2004 | Nishi | |
| 6,728,775 | B1 | 4/2004 | Chaddha | |
| 6,754,905 | B2 | 6/2004 | Gordon et al. | |
| 6,788,704 | B1 | 9/2004 | Lindsay | |
| 6,798,842 | B2 | 9/2004 | Jiang | |
| 6,832,241 | B2 | 12/2004 | Tracton et al. | |
| 6,832,385 | B2 | 12/2004 | Young et al. | |
| 6,883,000 | B1 | 4/2005 | Gropper | |
| 6,883,110 | B1 | 4/2005 | Goddard | |
| 6,970,928 | B2 | 11/2005 | Ihara et al. | |
| 7,043,633 | B1 | 5/2006 | Fink et al. | |
| 7,082,573 | B2 | 7/2006 | Apparao et al. | |
| 7,305,486 | B2 | 12/2007 | Ghose et al. | |
| 7,502,318 | B2 | 3/2009 | Lindsay | |
| 2002/0066106 | A1 | 5/2002 | Kanojia et al. | |
| 2002/0080807 | A1 | 6/2002 | Lind | |
| 2002/0120706 | A1 | 8/2002 | Murphy | |
| 2002/0129375 | A1 * | 9/2002 | Kim et al. | 725/100 |
| 2003/0004975 | A1 * | 1/2003 | Nakano et al. | 707/200 |
| 2003/0014526 | A1 | 1/2003 | Pullara et al. | |
| 2003/0071840 | A1 | 4/2003 | Huang et al. | |
| 2003/0075067 | A1 * | 4/2003 | Welch et al. | 101/483 |
| 2003/0131007 | A1 | 7/2003 | Schirmer et al. | |
| 2003/0137541 | A1 | 7/2003 | Massengale et al. | |
| 2004/0066411 | A1 | 4/2004 | Fung et al. | |
| 2004/0107198 | A1 | 6/2004 | Ronstrom | |
| 2005/0028104 | A1 * | 2/2005 | Apparao et al. | 715/738 |
| 2005/0065845 | A1 | 3/2005 | DeAngelis | |

OTHER PUBLICATIONS

SkyStream Networks Inc.TM, "Deploying Push Movies On Demand: The Right Media Delivery Platform Helps Service Providers Turn Content Into Cash", 2004.

SkyStream Networks Inc.TM, "Leveraging the PVR Boom with Push Video-On_Demand: A New Way to Offer DRM-Protected, On-Demand Services that Improve Subscriber Satisfaction and Add New Operator Revenues," 2005.

* cited by examiner

LOCAL DIGITAL ASSET STORAGE MANAGEMENT TECHNIQUE

FIELD OF THE INVENTION

The present invention pertains to the management and storage of digital assets, such as audio signals, moving picture signals, still pictures, executable code, text and the like, and combinations thereof (e.g., audio-visual programs, electronic games, web pages, etc.), in the storage device of a user appliance, such as a personal video recorder, set top box, mobile phone or storage server.

INCORPORATION BY REFERENCE

Applicant hereby expressly incorporates by reference herein International Patent Application No. WO 002003024036A1, entitled "Method And System For Scheduled Streaming Of Best Effort Data," published Mar. 20, 2003.

BACKGROUND OF THE INVENTION

A digital asset is a digital representation of information that can be used, i.e., moved, copied, modified, rendered or executed. Common examples of digital assets are audio signals (such as songs, mobile phone ring tones and movie sound tracks), image signals (such as moving pictures, still images, fonts and clip art), text and other file-based data (such as news articles, databases and spreadsheets) and executable code (such as computer programs). Digital assets may include different combinations of these items. For example, a typical movie may include one or more video programs, one or more accompanying audio signals, closed-captioning text, etc. Also, more complicated composite digital assets may be created including individual component digital assets.

Absent other controls, digital assets are normally amenable to the following types of uses by users: copying (i.e., making an additional replica of all or part of the digital asset), movement (i.e., transferring the digital asset from one location to another), rendering (i.e., converting all or part of the digital asset to humanly perceivable form, such as by displaying or reproducing an audible sound), modification (i.e., editing the digital asset) and execution (i.e., causing a programmable apparatus to treat the digital asset as executable instructions and to act as directed by such instructions). Digital rights management ("DRM") refers to managing or controlling the use of digital assets. Many different types of controls have been examined including absolutely preventing certain types of uses or permitting certain uses only under certain conditions. For instance, it might be of interest to allow a user to watch a certain audio-visual program but to prevent the user from copying the audio-visual program. This is an expression of the rights that are intended to govern, i.e. to be enforced on, the audio-visual program digital asset. DRM institutes measures to cause apparatuses to be governed by such rights.

Historically, information such as audio programming or audio-visual programming has been delivered in a broadcast fashion and according to the schedule of a broadcaster. For instance, a radio broadcaster would choose live and pre-recorded audio, such as songs, newscasts, sportscasts, interviews, etc. and an appropriate schedule for delivering such audio. Likewise, a television broadcaster would choose live and pre-recorded audio and video, such as television shows, newscasts, sportscast, program guides, etc., and an appropriate schedule for delivering such audio and video. Such audio or audio-video programming would then be broadcast to all reception capable consumer appliances, such as radio receiver sets or television receiver sets, strictly according to the schedule of the broadcaster. A consumer desiring to listen to and/or watch such programming would have to tune their respective receiver set at the appropriate time to listen to or view a particular audio or audio-visual program segment. (Herein, "programming segment" means a particular portion of a signal with a definite start and stop time, such as a television show, radio show, commercial, etc.) If the consumer did not use their radio receiver set or television receiver set at the appropriate time, the user would miss all or part of the desired programming segment.

Equipment manufacturers developed consumer playback and recording appliances for playing back and recording audio-visual programs, such as video cassette recorders ("VCR's"), DVD players, DVD recorders and personal video recorders ("PVR"), which are also commonly referred to as digital video recorders ("DVR"). For example, a PVR is distributed under the brand name TiVo™ by a company called TiVo, Inc.™, located in Alviso, Calif. This PVR contains a fixed magnetic disk recording device or "hard disk drive." The PVR is connected to the phone network and receives programming segment information (i.e., the name of each programming segment, the program number on which the segment will appear and the start and stop times of the programming segment) in the form of an electronic program guide ("EPG") that can be presented to the user through a graphical user interface. Specifically, the electronic program guide is displayed in tabular form on a display device as part of an on-screen display. The user can then use simple navigation controls (i.e., left, right, up, down, select, etc.) for choosing upcoming programming segments to be recorded. Other PVR's include a combined DVD recorder/PVR marketed by Panasonic™, a company located in Osaka, Japan and a combined cable television set-top box/PVR marketed by Scientific Atlanta™, a company located in Lawrenceville, Ga. This latter set-top box appliance also receives, tunes, demodulates, demultiplexes, deciphers and decodes ("decompresses") the audio-visual programming during normal real-time, i.e., non-recorded playback, television viewing by the user.

Not all digital assets are available from a broadcast network. Typically, executable code is only available for purchase on a pre-packaged storage medium, such as a DVD or CD disc, or by download from a computer network, such as the Internet. Some cable operators do broadcast music, but they do not publish broadcast schedules, so it is difficult for a user to pre-arrange to record a desired song. Furthermore, many movies are never broadcasted or are not broadcasted until some later date. Rather, such movies are available only, or at least initially are available only, for purchase or rental on pre-packaged stored media, such as DVD discs or VCR tapes. The disadvantage to the user of obtaining digital assets by pre-packaged stored medium is that there is a delay between the user's desire to use the digital asset, which is often spontaneous, and the availability to the user of the pre-packaged stored medium containing the content.

Many digital asset owners are still reluctant to freely deliver their digital assets via the Internet, because they fear that this will encourage wide-spread unauthorized copying, distribution and use of the digital asset. For instance, few movies are legally authorized for delivery to the user via the Internet. In any event, even using a typical high speed connection, it is generally not possible to deliver the movie for viewing in real-time, on account of the non-continuous or bursty nature of the individual networks that make up the Internet. As an alternative, it is theoretically possible to deliver a movie via the Internet for local storage prior to viewing, thereby circumventing the burst delivery short-coming of the Internet. However, delivery of an entire movie, which can be on the order of 10 gigabytes total in length (depending on the duration of the movie and manner by which it is compressed), would nevertheless take on the order of 12 hours assuming a very high average delivery rate of 2 megabits per second via a broadband Internet connection. This delay might not be any shorter than the time it takes the user to visit the local movie rental store and therefore might not offer an attractive alternative for the consumer. This is especially true if the delivery rate for the movie is, on average, 1 megabit per second or lower, which may be more typical for most conventional broadband Internet connections.

Separately, network service providers have attempted to respond to consumer demand for a more flexible viewing/listening schedule. For example, many cable service providers now provide so-called "video-on-demand" ("VOD") service. In a typical VOD service, such as is provided by Time Warner Cable™ of New York and New Jersey, a company located in New York, N.Y., the user is provided an EPG which lists certain audio-video programming segments that can be chosen by simple on screen navigation controls. Upon selecting a particular audio-visual program segment, a head end transmitting station attempts to deliver the selected audio-visual programming segment to the particular user who selected the program. The user has some playback control functionality similar to a VCR; using a remote controller, the user can fast forward, reverse, pause, stop and restart a selected audio-visual programming segment. However, this system has some short-comings. First and foremost, a communication channel must be available for each specific user who desires to use the VOD service at the same time. This has proved to be a challenge for cable service providers who are also simultaneously trying to deliver traditional broadcast audio-visual programming, high speed cable modem service and telephone service all on the same communication medium. Second, the server and transmission equipment at the cable head end station must be capable of delivering enough copies of all desired audio-visual programs that are demanded at that moment. Consider the specific problem of a very popular movie that has just been made available on a certain Friday night, starting at 5:00 pm. If the demand is extraordinarily high for that particular movie, many consumers will attempt to demand the same movie simultaneously, albeit with slight time differences between the respective viewers. For instance, if the most popular time for watching a movie is between 7:00 and 8:00 PM, it is quite possible for one user to demand that the movie start at 7:00 sharp, another at 7:05 and 30 seconds, another at 7:17 and 25 seconds, etc. Thus, the server and transmitter equipment must be able to deliver each of these multiple copies of the movie at the requisite demanded time. More often than not, these constraints of the network prevent fully-flexible delivery of VOD or curtail the number of different audio-visual programming segments that can be offered to the user at any one moment in time.

Yet another solution has been provided for delivery of VOD service to the user which attempts to leverage all of the benefits, and circumvent all of the short-comings, of the various networks and consumer appliances mentioned above. Specifically, MovieBeam, Inc.™, a company located in Burbank, California, has provided a unique VOD solution that is achieved using special PVR-like player appliances available to the consumer user and a head end broadcast service for distributing audio-visual programming segments. The system works as follows. The consumer user can purchase the player appliance from a store. The player appliance has an antenna that is capable of receiving a VHF or UHF signal, a modem jack for plugging the player into the user's phone line and audio-video output jacks for connecting to a television set and loud speakers. Internally, the player has a high capacity fixed magnetic disk. At the time of purchase, the magnetic disk has already been pre-loaded with the most current selection of movies available to other consumer users of the MovieBeam™ service. The user connects the player appliance to the user's phone line, to a television antenna and to the user's television and sound system. Immediately, the user can access any one of the pre-recorded movies on the player appliance for playback with full navigation controls (e.g., reverse, fast forward, pause, stop and restart). Meanwhile, new movies are broadcast from a terrestrial broadcast head end station via the VHF or UHF channels, which are received by the user's player via the antenna. This broadcast and replacement occurs without request by the user and more or less continuously over time and invisibly from the perspective of the user—the user need not perform any action to initiate the replacement of movies. This unsolicited delivery of information from a source (the head end station) to a destination (the player) is referred to as a "push" delivery model. The replacement of existing movies on the player appliance by the new movies refreshes or rotates the selections available to the user.

As a business model, the user pays a fee to purchase the player appliance, e.g., $199, plus a rental fee of, e.g., $1.99-$4.99 per movie rented. The player communicates customer usage (i.e., the individual movie rentals) to a central billing facility via a modem built into the player and the telephone connection to the player. The player is delivered with 100 different movies and movies are replaced at the rate of about 10 movies per week.

The MovieBeam™ service provides the following advantages:

(1) Bandwidth utilization of the broadcast channel is maximized in that movies need only be delivered once to all consumers, yet can be played by multiple subscribers and multiple times.
(2) Similar to VOD, the consumer can immediately and spontaneously view a movie at the time of his or her choosing, provided it is already stored in the library maintained on the fixed magnetic disk of the player.
(3) Similar to a VCR, PVR or DVD disc player, the consumer has full playback control including fast forward, reverse, pause, stop and restart capability.
(4) Similar to the PVR, the consumer can quickly switch between different movies without having to eject and load different removable storage media.
(5) The pricing is competitive with movie rental retail outlets yet provides instant access to the movies.
(6) The consumer need not return the storage medium containing a rented movie to a remote location.

It is desirable to provide a system that facilitates the local management of digital assets, e.g., in a push model delivery system, such as the MovieBeam™ system. However, the invention is amenable to other kinds of networks and consumer/end-user appliances, such as cable networks and set top boxes, and cellular networks and mobile phones.

SUMMARY OF THE INVENTION

A technique is described for managing the local storage of digital assets, such as audio, (moving or still) pictures, text, executable code and combinations thereof, in the storage device of a user appliance, such as a personal video recorder, set top box or mobile phone. A digital asset is received that is intended for local storage in the storage device and that has been pushed down from a source. A rank order is assigned to each digital asset stored or to be stored in a storage device that has a finite capacity storage space for storing digital assets. The assigned rank orders of one or more of the digital assets are repeatedly examined and a digital asset having a rank order that is lowest among the examined rank orders may be deleted. Each rank order is assigned based on predefined default ranking rules and user instructions pertaining to one or more of the digital assets that are capable of causing a deviation from the default ranking rules, if any have been provided by the user. A signal may be provided containing executable instructions that can be executed at programmable electronic circuits for performing the above steps. Such a signal may be stored on a storage medium. A system for performing the above steps may include a receiver for receiving the digital assets and a processor for assigning ranking orders and for repeatedly examining the ranking orders and deleting digital assets with low ranking orders.

DETAILED DESCRIPTION OF THE INVENTION

An illustrative embodiment of the invention is an electronic appliance that receives digital assets by a push delivery model and stores such digital assets. However, the invention is not strictly limited to the push delivery model and also applies to a pull delivery model (in which the destination must issue a request to a source in order to cause the source to transfer information to the destination) or a hybrid of the two models. Also, the invention is illustrated for an appliance that only receives digital assets, namely, an appliance that is strictly a playback device. However, the invention also applies to appliances that function as local servers, i.e., which receive and store digital assets for later transfer to yet other appliances for storage, playback and/or rendering. The invention is also illustrated for a network in which digital assets are primarily transmitted by RF or microwaves in a broadcast fashion to all consumer appliances within the range of coverage of the transmitting tower(s) or satellite(s). The invention is specifically illustrated for an ATSC compliant terrestrial broadcast signal. However, the invention applies to other terrestrial broadcast signals, such as DVB-T or DVB-H compliant signals and other types of wired and wireless broadcast signals such as DVB-S, DVB-S2 and DVB-C compliant signals. Likewise, the digital assets in the description below illustratively are movies, possibly also including coming attractions, textual descriptions, etc. However, the digital assets can also be of any type including audio signals, still images, readable text, databases, spreadsheets, executable code, games, web pages, etc. Also, the invention furthermore applies to other types of appliances such as mobile phones, set top boxes or personal digital assistants. Transmission of digital assets can also be achieved by the following standards: IEEE 802.11a/b/g or 802.11n ("WiFi"), 802.16e ("WiMAX"), CDMA, GSM, TDMA, etc.

Figure 1:
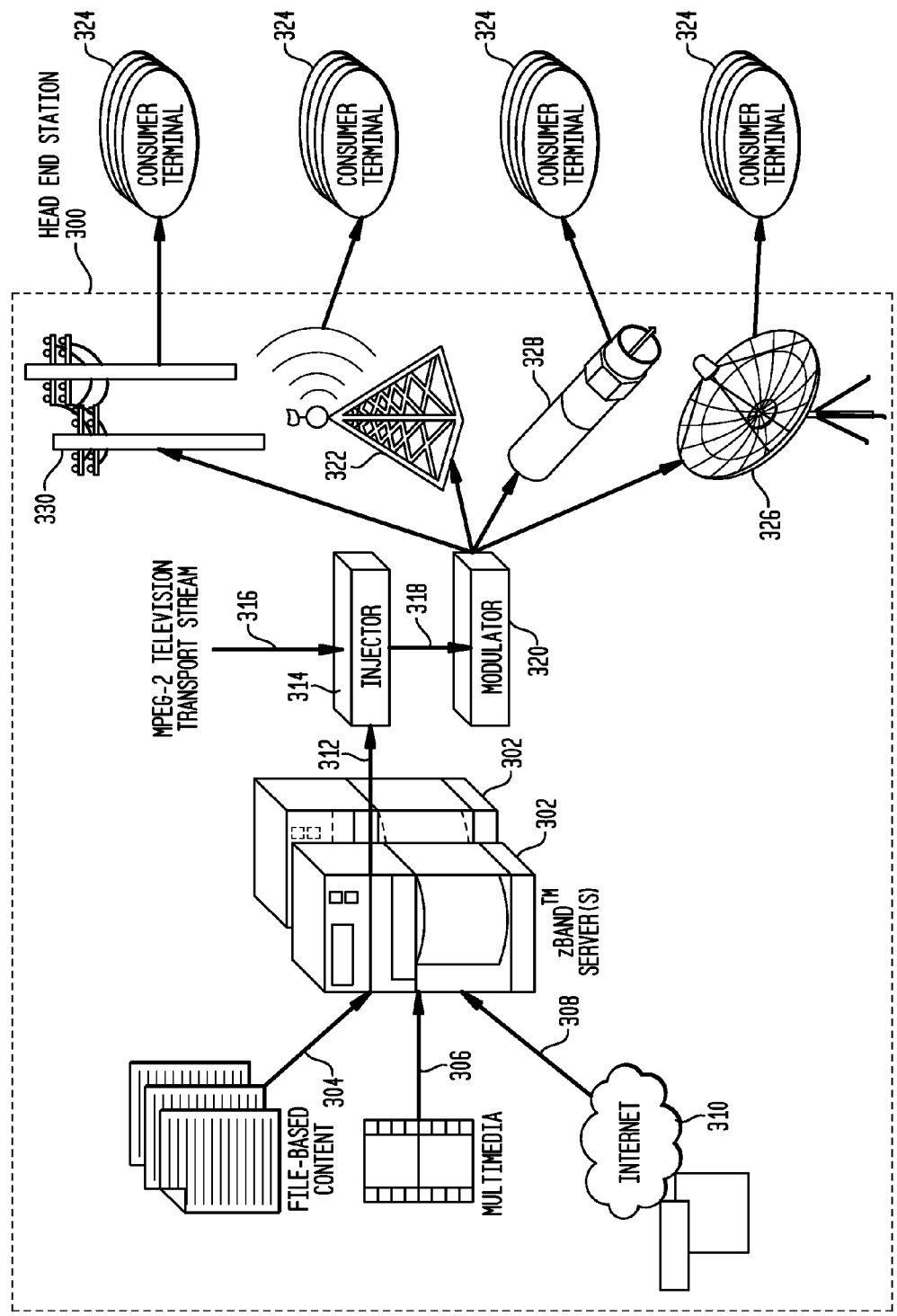
FIG. 1 shows an illustrative network in which the invention may be deployed.

FIG. 1 shows a basic end-to-end system in which the invention may be deployed. At a head end station 300, one or more servers 302 collect different types of digital assets for transmission. As shown, the digital assets may include one or more file-based content 304 (e.g., text, spreadsheets, databases, executable code, games, etc.), one or more multimedia types of content 306 (e.g., songs, sounds, ring tones, still images, moving picture images, movies, text, etc.) or content 308 periodically retrieved from the Internet 310 (e.g., web pages, audio programming segments, audio-visual programming segments, etc.) by the server(s) 302. Illustratively, the server(s) 302 are zBand™ servers, i.e., server computers that also run the zBand™ Director software, available from TANDBERG Television Inc.™. At the appropriate time, and under control of the zBand™ server(s), aggregated digital assets 312 and possibly other content are delivered in a controlled fashion to an injector 314, which may be an SMR-24™, SMR-25 or SMR-26 Source Media Router™, a MediaPlex-20 Video Services Router™ or an iPlex Video Headend Platform™, all of which are available from TANDBERG Television Inc. The injector 314 inserts the digital assets 312 into another MPEG-2 Transport Stream, e.g., an ATSC compliant MPEG-2 Transport Stream carrying ordinary broadcast television signals. The digital asset data, itself, is placed into Internet Protocol ("IP") packets, which in turn are placed into MPEG-2 Transport Stream packets that are remultiplexed with an existing MPEG-2 Transport Stream 316 carrying the ordinary broadcast television signal(s). The remultiplexed MPEG-2 Transport Stream 318 carrying the television signals and the digital asset signals are then modulated by a modulator 320, e.g., according to 8-VSB modulation, and the modulated signal is transmitted by an antenna 322 on an appropriate frequency channel to multiple consumer terminals 324 simultaneously.

The MPEG-2 Transport Stream 318 may be modulated and transmitted from the head end station 300 to the consumer terminals 324 in other ways. For instance, the signal 318 may be modulated using an OFDM modulation according to the DVB-T or DVB-H standards and transmitted terrestrially via the antenna 322. The signal 318 may be QPSK modulated according to the DVB-S standard and transmitted partly through space, via a satellite dish 326 and satellite (not shown). The signal 318 may be QAM modulated according to the DVB-C standard and transmitted by a cable plant 328. The signal 318 can also be modulated according to the V.92 standard or ADSL standards and transmitted via a telephone line 330. The signal 318 may also be OFDMA modulated according to the IEEE 802.16e standard and transmitted via the antenna 322. Other wireless transmission possibilities include those that accord with GSM, TDMA, CDMA and/or 802.11a/b/g or 802.11n. An antenna, such as antenna 16, a wireless NIC 15 or other suitable structure may be used for this purpose.

Figure 2:
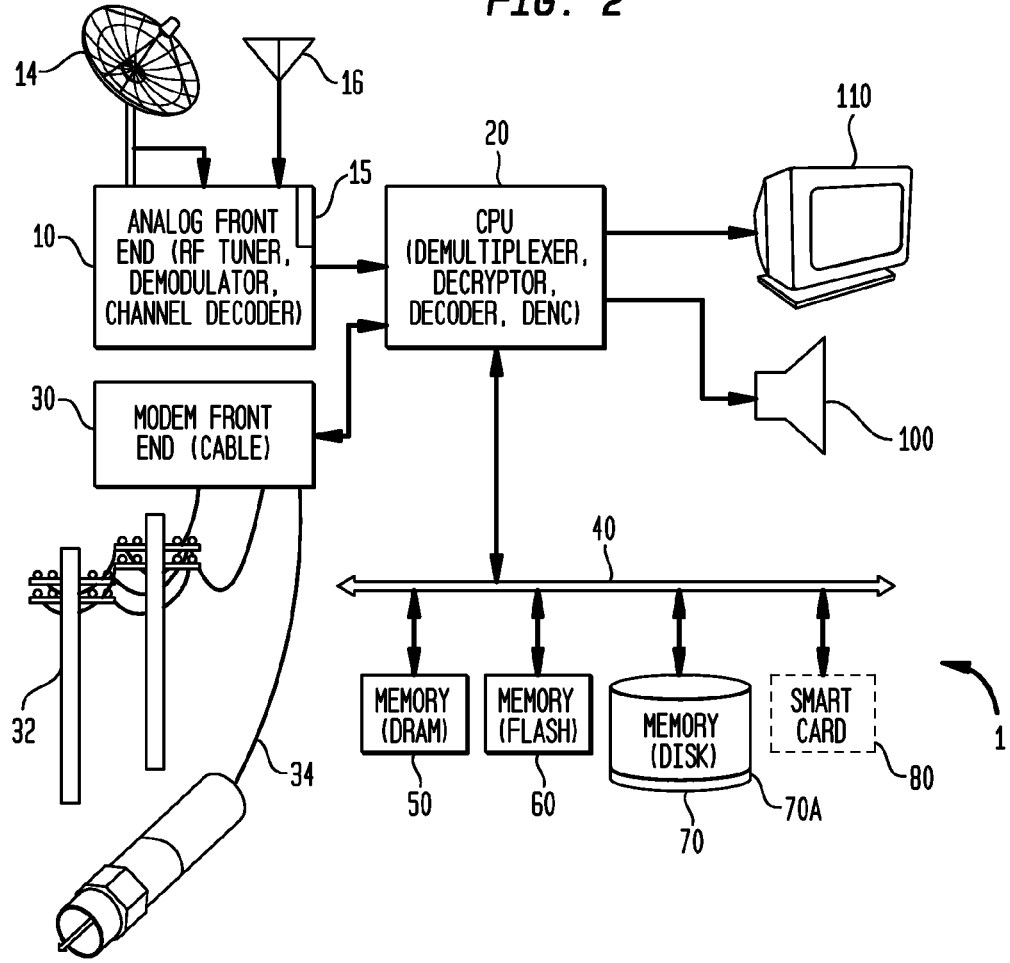
FIG. 2 shows an illustrative apparatus according to the invention.

FIG. 2 shows an illustrative electronic receiver appliance 1 that may form part of a consumer terminal, e.g. consumer terminal 324 in FIG. 1. The appliance 1 has an analog front end 10 for receiving a transmitted signal, such as a VHF/UHF RF or microwave signal tuner, a demodulator and a channel decoder. Illustratively, the appliance receives the broadcast transmitted signal via an antenna 16 according to the ATSC standard which uses 8-VSB. However, the appliance could alternatively receive another type of signal, e.g., a DVB-S signal via the dish shaped antenna 14. Also, in the case of some other type of communication, such as according to the IEEE 802.11a/b/g, 802.11n or 802.16e Standards, the front end 10 can also transmit signals provided by the processor 20.

If necessary, the appliance 1 can also have another front end circuit 30 for transmission (and also reception), for example, a modem analog front end. The modem analog front end circuit 30 might communicate in a bidirectional fashion over a telephone network 32 or a cable network 34. Illustratively, the modem analog front end modulates and demodulates signals according to the ITU-T V.92 Standard.

The demodulated signal illustratively is a sequence of MPEG-2 Transport Stream packets that make up the MPEG-2 Transport Stream transmitted via the channel to the receiver appliance 1. These Transport Stream packets are provided to a processor circuit 20 which demultiplexes the Transport Stream packets carrying the digital assets, recovers the IP packets carried in these demultiplexed Transport Stream packets that contain the digital assets, and stores the recovered digital assets in a memory, such as a fixed magnetic disk 70. Alternatively, one or more of the digital assets may be stored in another type of memory such as the flash memory 60 or the DRAM 50. To that end, the processor 20 transfers the data of the digital assets for storage via the bus 40 to the appropriate memory 50, 60 or 70. The processor 20 can also perform all of the functionality necessary for VOD playback including: (1) providing on-screen displays and/or audio cues to a user, and responding to instructions provided by the user (e.g., via a remote control or operation panel) to achieve a graphical user interface control for the user; (2) retrieving digital assets from memory 50, 60 or 70; (3) decrypting or deciphering the digital assets; (4) decoding or decompressing the digital assets; (5) enforcing rights or other controls associated with managing or controlling the usage of the digital assets; (6) using the digital assets consistent with the rights including rendering the digital assets; and (7) transmitting information via the modem front end 30.

Illustratively, the processor 20 is a programmable circuit whose operation is controlled by executable instructions or code located in one of the memories 50, 60 and/or 70. Also, if desired, a smart card reader may be provided for accepting smart cards 80 or other solid state removable media. A smart card 80 is a storage medium which may be used to store keys or other messages used for protecting confidentiality, or protecting integrity, of digital assets. For example, the smart card 80 might store private keys, that can be used to decipher the digital assets. If not provided by smart card 80, such keys or other messages may be stored elsewhere, e.g., in (a tamper proof portion of) the flash memory 60.

Two rendering devices are shown attached to the appliance 1, namely, a display 10 for displaying images and a loudspeaker 100 for reproducing sounds. Other rendering devices may also be provided such as a printer. The display 110 may be virtually any display device suitable for viewing images such as a cathode ray tube, liquid crystal display panel, plasma display, projection display, light emitting diode display, organic light emitting diode display, etc. In the case of an appliance that is also a mobile phone or personal digital assistant, the display 110 and loudspeaker 100 might also be incorporated into the appliance 1.

Figure 3:
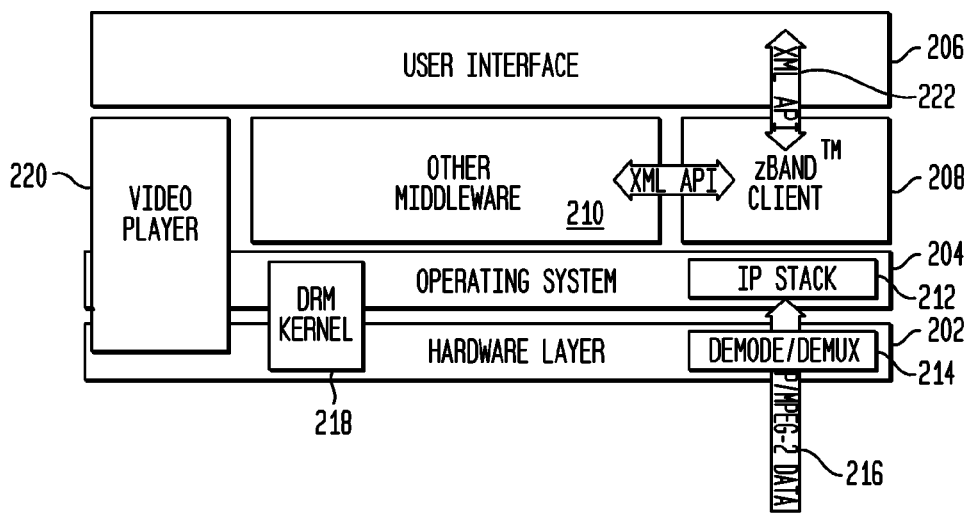
FIG. 3 shows an illustrative layered environment in which the invention operates.

Illustratively, the appliance 1 efficiently manages the storage of digital assets in the memory 50, 60 and/or 70. FIG. 3 shows a hierarchical environment in which the invention operates. Illustratively, the invention may be implemented by executable code stored in one of the memories 50, 60 or 70 and executed by a programmable device, such as the processor 20. Such code illustratively is incorporated into the zBand Client™ software code module 208 which is available from TANDBERG Television Inc.™ Illustratively, the module 208 manages the receipt and storage of information. Illustratively the module 208 is modified to achieve the inventive functionality described below. Illustratively, if implemented by software, the appropriate software code for achieving the inventive functions described below is initially delivered with the appliance from the factory. Alternatively, the software code of the invention may be (pull delivery model) downloaded by the appliance from a (private network or Internet) source of the executable code via the telephone path, or pushed down from the head end station, and then stored in the appropriate memory 50, 60 and/or 70. Software upgrades can also be delivered by pull delivery model download or push model broadcast (or both).

The interaction of the modules of FIG. 3 is as follows. MPEG-2 Transport Stream packets containing IP packets 216 are received at a hardware layer 202, specifically a demodulator and demultiplexer 214. As noted above, demodulation can be performed by the front end 10 or 30 and MPEG-2 Transport Stream demultiplexing can be performed by the processor 20. Illustratively, in the demultiplexing operation, the processor 20 performs a type of packet identifier or PID filtering, according to which the PID field of each Transport Stream packet is examined and only those Transport Stream packets labeled with one or more PID values of interest are retained. The IP packets are recovered from such retained Transport Stream packets and the recovered IP packets are processed by a well-known IP stack 212 which is supplied with the operating system 204 of the appliance 1. Illustratively, the operating system 204 can be any one of the Linux, Windows CE, Windows XP or VxWorks operating systems, executing on the processor 20. Once processed, the digital asset can be stored in one of the memories 50, 60 or 70.

As shown, the module 208 communicates with a graphical user interface 206 via extensible markup language application programming interfaces (XML API's) 222. Through this communication, the user can control or adjust certain parameters described below which vary the manner by which digital assets are retained in, and deleted from, the appliance 1 (in the memory 50, 60 or 70) and their priority of retention. The module 208 also communicates with other middleware 210 via XML API's. Through this communication, the module 208 can cause the middleware 210 and operating system 204 to manage the storage space in the memory 50, 60 or 70, in accordance with the user's parameters and other default rules as described below. Also shown are a video player 220 and DRM kernel 218. The DRM kernel 218 enforces the rights and controls that govern usage of the digital assets. Illustratively, for the sake of increasing security, the DRM kernel 218 is partly implemented at the hardware layer 202. The video player 220 includes the decoder/decompressor for the digital asset and also achieves playback control (i.e., reverse, fast forward, play, pause, stop, restart etc.). The following is a sample list of decompression processes that can be performed on the digital assets by the processor 20: JPEG/JFIF, MPEG-1 Video, MPEG-2 Video, MPEG-4 Video, MPEG AVC/ITU-T H.264, VC-1, MPEG-1 Audio (including so-called MP3), MPEG-2 Audio, MPEG AAC, Dolby AC-3, DTS, HD-DTS, SDDS, ATRAC, Meridian Lossless Packing, LPCM, DVD Subpicture Decode (according to the DVD Video Standard), "Zip", etc.

Given this background description, preferred embodiments of the present invention will now be described. It will be understood, of course, that these embodiments are described by way of example only and do not limit the scope of the invention.

Fundamentally, the present invention operates based on a system of caching (i.e., locally storing in a particular storage space or "cache") files on a storage system box (such as the appliances), where the files are pushed (or pulled) to the box using rules set by a combination of the service provider and the local user, e.g., the owner/renter of the box. The cache used in accordance with the present invention is advantageously a locally provisioned, fixed sized partition 70a of a memory, such as the fixed magnetic disc 70, dedicated to the storage of digital assets in an on-demand system. This cache is advantageously designed to maximize the relevance to the user of the digital assets currently stored therein. In addition, the cache is thereby designed to ultimately increase, and desirably maximize, the revenue associated with the consumption of the digital assets. In other words, if the cache is designed to store at least those digital assets that the user most especially wishes to consume, the user will be pleased to be able to rent those items which best please him or her, and the provider will garner increased revenue as the user increases the number of rentals and purchases. Thus, the cache system of the present invention is most truly a win-win system.

The cache system in accordance with the present invention provides additional advantages. For example, the service provider can receive feedback as to which digital assets the user rents, and may therefore be in a better position to offer more desirable digital assets tailored to that user's interest. Because the user is not obliged to rent any of these digital assets, there is no downside to this tailored offering.

While the particular setup of a cache system in accordance with the present invention will of course vary depending on the overall system within which it resides, it is still possible to establish certain requirements and/or goals to be met by the cache system. Some of these requirements/goals may be summarized as follows:

(1) The cache advantageously should have a fixed size, set by the user. For example, if the user chooses to store 100 movies or only 10 movies at a time in the cache, this should be at the user's option.

Generally, the cache storage is set to be a fixed size local storage partition in the storage box, for example, 100 Gbytes. As the user removes digital assets from the cache or as digital assets are automatically removed after, e.g., a defined elapsed time without being rented, this fixed size can provide information to the provider to know when more digital assets can be pushed down. Alternatively, the provider need not necessarily know when no more digital assets can be pushed (i.e., when the cache is nearly or completely full).

(2) The cache must prevent other applications within the overall system from using its allocated space. This could be achieved, for example, by initially filling the cache with dummy data. As digital asset data is received, it would replace the dummy data. Even without any further security measures, this would generally be effective, because the other applications can thereby be made to consider the cache to be full and/or difficult to overwrite. The other applications would therefore simply look for other areas to utilize.

Of course, more powerful security methods may be used if deemed appropriate or desirable. Moreover, the system box itself generally includes powerful security methods, such as smart cards, encrypted hard discs, a tamper resistant housing and the like.

(3) The cache can advantageously be optimized for an embedded storage system, i.e., a special purpose device such as a set top box, PVR or cell phone. The cache is illustratively not deployed in a general purpose device, such as a PC, so that a user will not be able to add his own programs to the storage system. As a result, storage areas in the memory can be pre-allocated for a variety of purposes, as appropriate, before the storage system box is shipped out to the user. Therefore, because dynamic storage need not be used, the system control knows where pre-allocated storage for a particular use is located in memory and the size(s) of this pre-allocated storage.

(4) The cache can be operated to minimize file fragmentation. For example, defragmentation programs are well known that operate to combine separated portions of files or other blocks of data that are intended to be contiguous sequences. As is well known in the art, fragmented files are files that have been divided into multiple fragments that are dispersed, at least partially, randomly over the logical storage space. Fragmentation may occur intentionally, or it may be the result of rewriting damaged areas of the file into new areas. Defragmentation, naturally, is the gathering into a sequential arrangement each of the sets of fragments that constitute the file, so that the defragmented file now covers a contiguous, unbroken area of the logical storage space. It may often occur that the defragmented file runs more efficiently than its fragmented version. Such defragmentation programs may be run in the background.

More importantly, however, the provider may be set up to push down a, e.g., 7 Gbyte digital asset at a designated time. The cache can be controlled so that it is aware of this coming push-down sufficiently in advance that it can set aside a continuous (or sufficiently continuous) storage area to receive therein this 7 Gbyte digital asset at the designated time, thereby avoiding unnecessary fragmentation problems. As will be described below, it may be necessary for the cache to delete certain low ranking digital assets in order to clear this 7 Gbyte storage area. Therefore, because the cache is aware of the designated time, it also knows that it does not have to delete the low ranking digital assets, i.e., set aside this 7 Gbyte memory space, until that time. Such a just-in-time "set aside" maximizes the availability of the digital assets, which again improves cache memory management.

(5) Closely related to point (4) is that the cache is able to provision (i.e., set aside) known quantities of space for incoming digital assets. This can be done for large digital assets, such as discussed in point (4), but it is also advantageous in providing for the orderly arrangement of standard sized or relatively small digital assets.

(6) The cache can be programmed, by the user or by the XML API, for "pinning," i.e., to retain certain digital assets regardless of the passage of time until that digital asset is expressly deleted or expired.

(7) The cache is programmed with ranking rules for the provided digital asset. These ranking rules control how the digital assets are stored and/or deleted, and can include both default ranking rules and overriding ranking rules. This subject is discussed more fully below.

(8) The cache may be programmed to be partitioned for different content types. For example, one portion of the cache (e.g., 20 Gbytes) may be set aside for promotions and advertising for upcoming movies, while another portion of the cache (e.g., 80 Gbytes) may be allocated for the movies themselves. Other-sized or additional partitions are possible depending on the circumstances.

(9) Also similar to point (4) above, the cache may be programmed for just in time delivery, i.e., the memory space for a particular digital asset is set aside just before that digital asset is provided. More specifically, the just-in-time delivery operation involves allocating space in the finite capacity storage space for storing a particular digital asset, as that digital asset is received, so that the space for storing portions of the digital asset is allocated just in time relative to the receipt of each such portion of the digital asset. Thus, the space for this digital asset is not monopolized too soon, i.e., an older digital asset that may end up being deleted when the new digital asset is received will remain available for use up to the very moment that the new digital asset is received. This is desirable to the user, since he has the option to rent the older digital asset for a longer period of time, and also helps optimize the rate at which the user rents movies, because the service provider does not want to keep old movies sitting around too long, nor does the service provider want available memory space unused.

(10) In the case that the cache is in an appliance that also functions as a PVR, the cache can be programmed for a local push of digital assets into the cache. That is, instead of the service provider pushing down digital assets directly to the cache, the user first records generally broadcast digital assets into the PVR. Then, with permission, a PVR recorded digital asset can be moved from the PVR to the cache. The software can be reconfigured such that only a portion of the cache is available for locally pushed digital assets.

(11) As noted above, DRM software is provided in the appliance to protect rights in the different digital assets. Examples of DRM software are the Encryptonite System DRM®, available from SecureMedia™, a company having offices in Boston, Mass., San Francisco, Calif. and Auckland, New Zealand, and Microsoft® DRM, available from Microsoft Corp.™, a company located in Redmond, Wash. The cache can be programmed to operate in accordance with conventional DRM software, and can be adapted to operate in accordance with new versions of DRM software as it is developed.

(12) Advantageously, the cache will support a download into the cache, i.e., where a particular digital asset is delivered by a pull-down delivery model.

(13) Advantageously, the cache will also support a Multicast Push into the cache, wherein the provider multicasts the same digital asset(s) to a group of storage systems, e.g., all of the storage systems having a particular subscriber level. Such multicasting may be over a network, such as a network of interconnected nodes.

(14) Advantageously, the cache can enforce the fact that a digital asset may be limited by a time-based contract, i.e., one having an expiry, so that this digital asset is only available until a certain time/date. After this time/date, the cache must delete this digital asset to comply with the contract.

Having described various features of the cache itself, it should be noted that digital objects stored in the cache are files, groups of files and/or meta-data. The meta-data may include, for example, text, ratings, genre descriptions, weblinks and the like. In this context, program segments are generally not considered to be files, but rather can be groups of files.

As mentioned above, advantageously the cache normally operates in accordance with default ranking rules that determine, over time, which digital assets are held in the cache and which digital assets are deleted. The default ranking rules should be set on the head-end and be announced to the users in a service announcement (or other initial setup announcement). The default ranking rules could then only be overridden or ignored if either the service provider changed the default ranking rule or if the user were provided with the authorization, for example, with a plug-in, to override the default ranking rules.

Advantageously, the default ranking rules would include the following factors for a particular digital asset:

(a) Is the digital asset currently being rented?—Do Not Delete (pin until the end of the rental period)

(b) Is the digital asset currently being browsed, e.g., is the user reviewing promotional material related to the digital asset that might lead him to rent the digital asset?—Do Not Delete (pin until the end of a relevant period of time)

(c) How long has the digital asset been in the cache?—ranking falls with age (d) Did the provider require the digital asset be placed in the cache?—ranking falls with age at the highest rate (e) Has the user marked this digital asset as a Favorite?—this digital asset is ranked higher by default, ranking falls with age at lowest rate (f) Did the user request download of the digital asset but not yet rent it?—rank falls with age at intermediate rate (g) Did the user purchase this digital asset? Do Not Delete (pin forever)

The following proposal for a default ranking scheme represents a preferred scheme yielding advantageous results as described above. It will be understood, or course, that other schemes may be used in appropriate circumstances, using some or all of the present scheme's features and/or incorporating new and different features to meet the requirements of new or differently arranged systems.

The following is an example of how a collection of digital assets (program segments) might be stored in the cache, including rules for calculating the rank of a particular digital asset (program segment) and rules for retaining/deleting the digital asset (program segment) based on its rank. As used herein, the term "rank ordering" of a particular digital asset will be understood to mean the relative rank of that digital asset in the context of the other ranked digital assets. Of course, other management examples are possible depending on the context and circumstances.

(A) Cache Scalar Variables:
A=age in cache (integer–seconds)
O=user requested (boolean)
V=count of times viewed (integer)
R=rented (boolean)
B=reviewed for possible rent (boolean-reverts to false after 24 hours)
P=purchased (boolean)
F=designated by user as a "Favorite" (boolean)
g=age threshold (default 90 days=7776000)

(B) The Ranking (Rank) is Calculated According to the Following Rules:
1. if P then RANK=1001, pinned; end;
2. if R then RANK=1001, pinned with expiry=rental_period; end;
3. if B then RANK=1001, pinned with expiry=rental_period; end;
4. if F then RANK=800;
5. else RANK=500 (normal), 750 (high), 400 (low), 1000 (highest), 300 (lowest)-provided by the program data as supplied by the head-end (default of 500);
6. if F then RANK=RANK−(floor(A/g))*10; (NOTE: decrease by 10 over 90 days)
7. else if O then RANK=RANK−(floor (A/g))*100; (NOTE: decrease by 100 over 90 days)
8. else RANK=RANK−(floor (A/g))*50; (NOTE: decrease by 50 over 90 days)

(C) Some Examples of Rankings:
1. Customer rents a movie for 24 hours—1001
2. Customer purchases movie—1001
3. Customer browses details of movie—1001 (for 24 hours or as defined by configuration parameter for the user)
4. Movie has been rented once and has been in cache for 30 days, downloaded by user—500−((2592000/7776000)*50)=483

5. Movie has been rented once and has been in cache for 30 days, operator pushed it there: 500−((2592000/7776000)*100)=466

6. Movie has been rented once and marked as a favorite, user downloaded 30 days ago: 800−((2592000/7776000)*10)=796

(D) Cache Ranking Mechanism

In this scheme the Cache rankings are calculated based on the following events:

1. On a scheduled basis, given a system configuration parameter for the client (default every 3 minutes), all program segments will be ranked 2. Immediately preceding transmission, the particular program segments will be ranked 3. On complete transmission of a program segment, it will be ranked immediately 4. When a user purchases a program segment, the program segment will be re-ranked 5. When a user browses the program segment details (e.g., previews promotional material), the program segment will be re-ranked 6. When a user sets a program segment as a favorite, the program segment will be re-ranked Advantageously, in accordance with the principles discussed above, the cache will be reviewed for possible deletions when a program segment is about to be transmitted. The lowest ranking program segments in the cache will be deleted in order until enough room is available to receive the new program segment, providing the incoming program segment is not ranked lower than any of the cached program segments. Program segments pinned in the cache will not be removed from the cache by anything other than a user request (with confirmation).

(E) Client Configuration Parameters

CacheTarget DirPath, Size: 0 or more parameters that describe a separate cache. The default cache will be the Client's Storage folder. Each additional cache will be treated with the above rules independently, e.g. CacheTarget/Storage/Meta_Files, 1000

CacheReservation (Size): Size of Default cache in bytes, e.g. CacheReservation 20,000,000,000

CacheRankingPeriod (Seconds): The duration of time it takes for a cache ranking to be reduced by 100 in the rankings. Default is 7776000 seconds, or 90 days. Digital assets older than this in the cache will be treated as less relevant.

(F) Cache Interface

The interface to the cache may be an agent interface provided using the XML protocol delivered using an HTTP request. The cache will not permit third parties to add digital assets unless directed through the agent interface. All files in the cache will be in a human-readable folder and file structure, with proper extensions to permit the management by a third party digital-rights-management system. Any content added to the cache by a third party will be removed by the cache management system. Given that this cache is designed to work in conjunction with a digital-rights-management system, users will be able to remove and/or copy contents from the cache if they have access to the native file system.

The information about the digital assets in the cache will be kept separately from the digital assets themselves, and will be in a form that is accessible to third parties through the agent interface.

In addition to the above-described embodiments and features, many other features of the present invention may be employed in different contexts and in different combinations to supplement and/or replace certain of the above-described features.

For example, a method for managing the storage of digital assets in a storage device may comprise the steps of:

(a) receiving a digital asset intended for local storage in a storage device that has been pushed down from a source, the storage device having a finite capacity storage space for storing digital assets, (b) assigning a rank order to each received digital asset stored in the storage device, and (c) repeatedly examining the assigned rank orders of one or more of the digital assets stored in the storage device and selectively deleting a digital asset having a rank order that is lowest among the examined rank orders, wherein each rank order is assignable based on predefined default ranking rules and user instructions pertaining to one or more of the digital assets that are capable of causing a deviation from the default ranking rules.

This method may further comprise the step of enabling one or more uses of the non-deleted digital assets by a user. Such enabled uses include one or more of: presenting in a directory listing an indication of availability of at least part of the non-deleted digital asset for use, rendering at least a part of the non-deleted digital asset, executing at least a part of the non-deleted digital asset, modifying at least a part of the non-deleted digital asset, transferring at least a part of the non-deleted digital asset to another medium, and copying at least a part of the non-deleted digital asset.

In the present invention, at least one of the digital assets may include one or more of an audio signal, a moving picture signal, text, executable code, and a still image. At least one digital asset may be stored in compressed form, in a form secure from unauthorized use, or both, and the storage in a form secure from unauthorized use may comprise storage in encrypted form.

As noted above, a method in accordance with the present invention may comprise the step of pulling down at least one digital asset for storage at the storage device.

A method in accordance with the present invention may further comprise at least one of the following steps:

(a) responsive to a user indication corresponding to the storage capacity of the finite capacity storage space, allocating a fraction of the total capacity of storage space of the storage device to be used for storing digital assets;

(b) preventing access to the storage space allocated for storage of the digital assets by at least one other device or application;

(c) using a local embedded file system for storing and retrieving each digital asset stored in the finite capacity storage space;

(d) minimizing fragmentation of each digital asset stored within the finite capacity storage space;

(e) for each received digital asset intended for local storage that is to be stored on the storage device, allocating a part of the finite capacity storage space for storing the received digital asset, if possible;

(f) receiving an indication from a user to assign a rank ordering to a digital asset that prevents deletion of the digital asset;

(g) receiving a new set of rules to be used in place of the predefined default rules for assigning rank order to a digital asset;

(h) partitioning the finite capacity storage space into plural partitions, where each of the partitions is for storing a different type of digital asset;

(i) allocating space in the finite capacity storage space for storing a particular digital asset, as that digital asset is received, so that the space for storing portions of the digital asset is allocated just in time relative to the receipt of each such portion of the digital asset;

(j) only enabling use of a particular digital asset that accords with rights permitted for such digital asset;

(k) pushing down the digital asset by multicast transmitting the digital asset; and (l) receiving at least one composite digital asset comprising a group of one or more component digital assets and zero or more metadata.

In accordance with the present invention, the default ranking rules may comprise one or more of the following:

(1) refraining from deleting a digital asset currently being rented;

(2) refraining from deleting a digital asset currently being used;

(3) reducing a ranking order of a digital asset based on a duration during which the respective digital asset has been stored in the storage device;

(4) ranking a digital asset as being in a group of digital assets last to be deleted amongst delete-able digital assets responsive to a user indication that the respective digital asset is a user's favorite;

(5) reducing a ranking order of a digital asset by a smaller amount than other digital assets whose rank is reduced, if the respective digital asset was pulled down but not used; and (6) refraining from deleting a digital asset that has been purchased.

The ranking operation may include the following steps:

(a) initially assigning a default numerical rank RANK as indicated by a source of a digital asset, wherein a larger value of RANK has a higher ranking order, and wherein delete-able digital assets are deleted in order of lowest numerical rank;

(b) if the respective digital asset is purchased, increasing the value of RANK to a default highest permissible value;

(c) if the respective digital asset is rented for a certain rental time period, increasing the value of RANK to the default highest permissible value until the expiration of the rental period;

(d) if the user has browsed the respective digital asset, then increasing the value of RANK to the default highest permissible value for a certain period of time following the browsing of the respective asset;

The ranking may further comprise at least one of the following steps:

(e) responsive to a user indication that the respective digital asset is a user's favorite, increasing the value of RANK to a value that is less than the default highest permissible value;

(f) if the digital asset was pushed down by the source, then reducing the value of RANK for that respective digital asset according to the formula:

$$RANK := RANK - \lfloor g/A \rfloor \times k_2$$

otherwise, reducing the value of RANK for that respective digital asset according to the formula:

$$RANK := RANK - \lfloor g/A \rfloor \times k_1$$

where:

A is the duration that the digital asset has been stored in the local storage device, g is a default maximum threshold storage duration $k_2$ is a certain reduction constant such that $k_2 > k_1$.

In accordance with the present invention, rank orders may be assigned to one or more digital assets according to at least one of the following events:

(1) after the elapse of each successive time period of a certain duration, all digital assets stored on the local storage device are ranked;

(2) assigning a rank order to a particular digital asset immediately preceding transmission of that respective digital asset from the source;

(3) assigning a rank order to a particular digital asset immediately upon completion of transmission of that particular digital asset;

(4) assigning a new rank order to a digital asset when it is purchased;

(5) assigning a new rank order to a digital asset when it is browsed; and (6) assigning a new rank order to a digital asset, responsive to a user indication that the respective digital asset is a user's favorite.

Furthermore, the examination of the assigned rank orders of one or more of the digital assets and the selective deletion of a digital asset having a rank order that is lowest among the examined rank orders, may comprises the following alternative steps:

(1) if there is sufficient spare capacity in the finite capacity storage space for storing a new digital asset to be transmitted, then the new digital asset is stored without requiring deletion of the digital asset having a rank order that is lowest among the examined rank orders; or (2) if there is insufficient spare capacity in the finite capacity storage space for storing a digital asset to be transmitted, then deleting at least the digital asset having a rank order that is lowest among the examined rank orders.

In accordance with the present invention, a method may comprise the step of receiving a command from a user to configure the management and storage of digital assets including at least one of the following commands:

(1) a command for designating additional storage space for storing digital assets including an indication of a location of the additional storage space and a storage capacity of the additional storage space;

(2) a command for changing the storage capacity of the storage space of the local storage device for storing digital assets; and (3) a maximum storage duration threshold used for reducing the rank order of digital assets stored on the local storage device.

The above description has been given in terms of systems, options and features of the present invention, which may advantageously be used in general apparatus and methods forming embodiments of the present invention. The flowcharts of FIGS. 4 and 5 illustrate exemplary general methods in accordance with the present invention, although of course many variations and combinations are also fully described and supported by the present specification.

Figure 4:
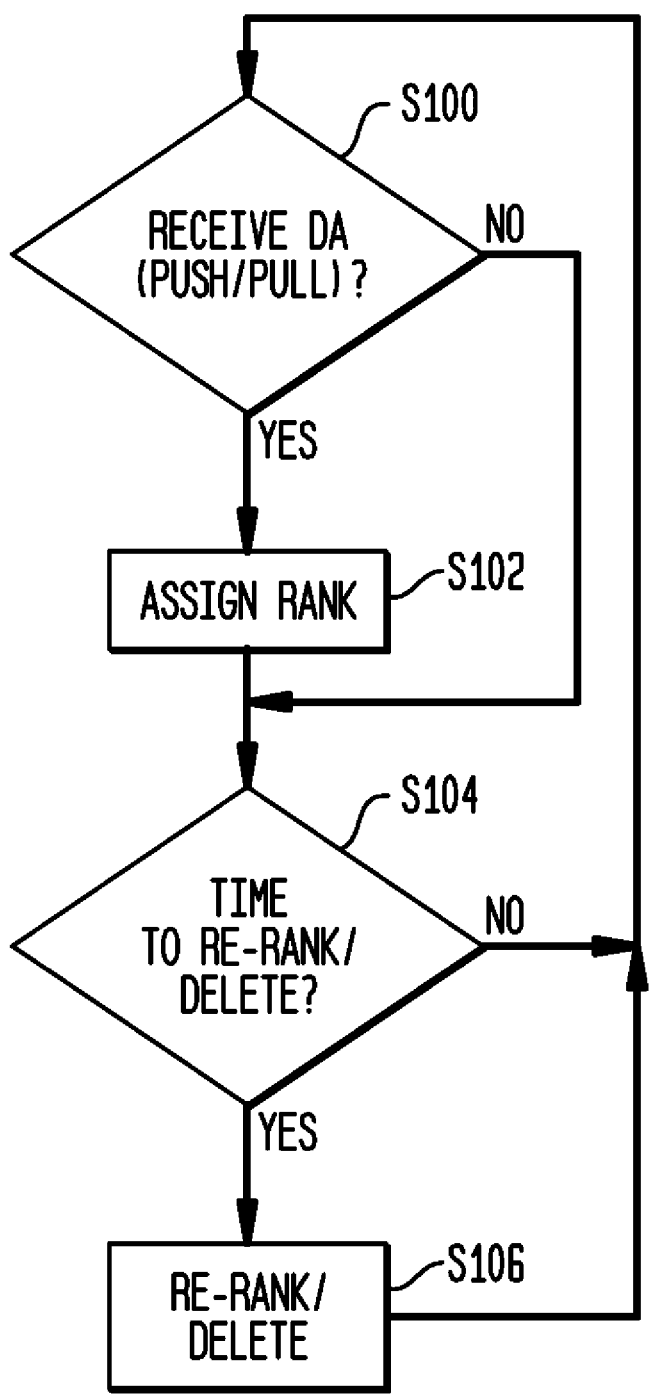
FIG. 4 shows an exemplary method for receiving and ranking digital assets in a cache system in accordance with the present invention.
Figure 5:
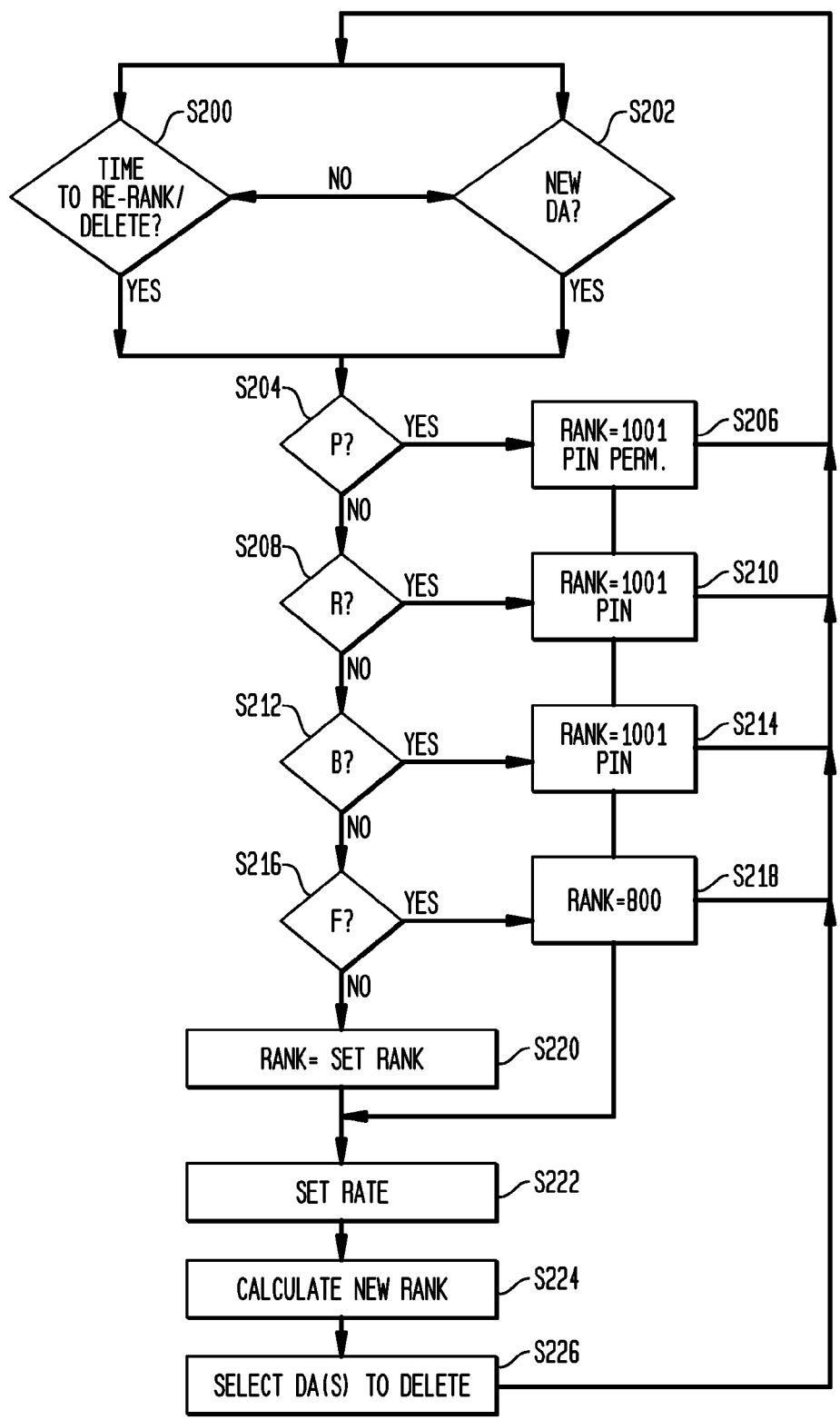
FIG. 5 shows an exemplary method for ranking/re-ranking and/or deleting digital assets in a cache system in accordance with the present invention.

FIG. 4 is directed to the general method of receiving and ranking each digital asset ("DA") in the cache system described herein. Due to the continual reception of digital assets and updating of the respective ranks, this general method does not have a unique starting step, but it is convenient to describe the method beginning with step S100, wherein it is determined whether or not a new digital asset is received by the cache as a result of, e.g., a push by the provider or a pull by the user. If a new digital asset has been received, the method proceeds to step S1102, wherein the new digital asset is assigned a rank in the cache. The operation of step S102 is described more fully below in connection with the method of FIG. 5.

If step S100 determines that no new digital asset has been received, the method proceeds to step S104, wherein it is determined whether or not it is an appropriate time to re-rank and/or delete digital assets already in the cache. If step S104 determines that the time is appropriate, then the re-ranking/deleting operation takes place in step S106. The operation of step S106 is also described more fully below in connection with the method of FIG. 5.

On the other hand, if it is not an appropriate time for re-ranking/deleting, then the method returns to step S100 to again determine if another new digital asset has been received. Each time step S1100 determines that a new digital asset has not been received, the method moves to step S1104 to determine whether or not it is an appropriate time to re-rank and/or delete digital assets already in the cache.

Thus, the method of FIG. 4 is a continuous method, keeping track of all incoming digital assets and maintaining the cached digital assets in their proper ranking.

FIG. 5 is directed to the general method of ranking the digital assets received by the cache and stored therein, and to the deletion of stored digital assets under the appropriate circumstances. As described above in the specification, there are many variations possible within the scope of the general method and/or compatible therewith. Some such variations have to do with the particular values selected for triggering ranking and/or deletion, and other variations have to do with the order of particular steps or the omission of certain steps depending on the particular application and circumstances. The disclosure of certain steps in a certain order is to therefore to be taken as the disclosure of the same or equivalent steps in different, but equivalent orders, and the disclosure of the presence or absence of certain steps is to be taken as the disclosure of equivalent methods omitting or including equivalent steps. It is to be understood, accordingly, that the method of FIG. 5 is only one of many embodiments within the scope of the present invention.

As with the method of FIG. 4, the method of FIG. 5 accommodates the continual reception of digital assets and updating of the respective ranks, and therefore this general method does not have a unique starting step. It is, however, convenient to describe the method beginning with step S200, wherein it is determined whether it is an appropriate time to re-rank and/or delete certain digital assets stored in the cache, as in step S104 of the method of FIG. 4. As noted in the specification above, such ranking/deletion may be scheduled to occur at predetermined intervals, or may occur in response to a specific event in the life-cycle of one or more of the digital assets or in the method. For example, as discussed above, a particular digital asset may be rented for a certain period of time, and at the end of that period its ranking will be changed. Step S200 is to be interpreted as covering any or all of these different circumstances triggering the re-ranking/deletion of cached digital assets.

Parallel to step S200 is step S202, wherein it is determined whether or not a new digital asset is received by the cache as a result of, e.g., a push by the provider or a pull by the user, as in step S100 of the method of FIG. 4. In the method of FIG. 5, a negative answer in either of steps S200 and S202 results in a check of the other step, whereby the method waits until a triggering event for ranking/deletion occurs. However, in response to a positive answer in either of steps S200 and S202, the method moves to a series of steps to determine what action by the user is to be taken with regard to a relevant digital asset and, accordingly, what rank that digital asset shall have or whether it should be deleted. One difference in processing may be that after a positive answer in step S202, only the new digital asset is processed, while after a positive answer in step S200, all the cached digital assets are processed. In the embodiment of FIG. 5, all cached digital assets are processed in each case. It should further be noted that the steps described below for the different user actions may be considered in any appropriate order, as the user actions are individual and (in most cases) mutually exclusive at any one time.

In the following discussion of the method of FIG. 5, it will first be assumed that a positive answer has been received from step S202, i.e., a new digital asset has been received.

In the exemplary embodiment of FIG. 5, a yes answer in step S202 moves the method to step S204, wherein it is determined if the digital asset has been purchased ("P") by the user. If the answer is yes, the method moves to step S206, wherein the digital asset is given the highest possible ranking, e.g., 1001, and is indicated as permanently "pinned," i.e., stored, in the cache. The method then moves back to the combination of steps S200 and S202.

If the answer in step S204 is no, the method moves to step S208, wherein it is determined if the digital asset has been rented ("R") by the user. If the answer is yes, the method moves to step S210, wherein the digital asset is given the highest possible ranking, e.g., 1001, and is indicated as pinned for a predetermined rental period. The method then moves back to the combination of steps S200 and S202.

If the answer in step S208 is no, the method moves to step S212, wherein it is determined if the digital asset has recently been or is being browsed ("B") by the user. If the answer is yes, the method moves to step S214, wherein the digital asset is given the highest possible ranking, e.g., 1001, and is indicated as pinned for a predetermined browsing period. The method then moves back to the combination of steps S200 and S202.

If the answer in step S212 is no, the method moves to step S216, wherein it is determined if the digital asset has been designated as a Favorite ("F") by the user. Such a designation means that the user does not as yet wish to purchase the digital asset, but wishes to keep it around longer than other digital assets of lesser interest, for future renting and/or purchase. If the answer is yes, the method moves to step S218, wherein the digital asset is given a medium high ranking, e.g., 800.

In the embodiment of FIG. 5, the determination of Favorite status is the final determination of special status for the new digital asset. If the answer in step S216 is no, then the new digital asset receives no special status, and is given a set ranking, e.g., 500, in step S220. Of course, the server may override this set rank with a determined value for the set rank at this step. In a possible alternative embodiment, the method may determines after step S216 that the processing began from step S202 (i.e., only one new digital asset is being processed), and move back to the combination of steps S200 and S202. In the embodiment of FIG. 5, the method moves to step S220.

It will be understood that in variations of the method of FIG. 5, this designation of set ranking can occur after whichever of the alternative special statuses is the last to be determined. Alternatively, the new digital asset could be given this ranking or a different ranking by the provider, before the digital asset is even sent, or it could be given the this or other ranking upon reception by the user end. The new digital asset could also be given the set ranking at any point in the status evaluation, provided that the method steps are constructed to finish with the digital asset having the intended status.

In the following discussion of the method of FIG. 5, it will now be assumed that a positive answer may have also been received from step S200, i.e., the method has determined that it is an appropriate time to rank, re-rank or delete certain of the digital assets already stored in the cache. All of the above comments will apply to this second run-through of the method of FIG. 5, except where particularly noted or necessarily required. This second run-through applies the method steps to each of the cached digital assets in turn, as appropriate.

In the exemplary embodiment of FIG. 5, a yes answer in step S200 again moves the method to step S204, wherein it is determined if the digital asset has been purchased ("P") by the user. It is to be remembered that a digital asset may previously have been received and cached as a rented, browsed, favorite or standard digital asset without having been purchased. If the answer is yes, the method moves to step S206, wherein the digital asset is given the highest possible ranking, e.g., 1001, and is indicated as permanently "pinned," i.e., stored in the cache. The method then moves back to the combination of steps S200 and S202 for consideration of the next digital asset.

If the answer in step S204 is no, the method moves to step S208, wherein it is determined if the digital asset has been rented ("R") by the user. It is to be remembered that a digital asset may previously have been received and cached as a rented, browsed, favorite or standard digital asset, and may be rented plural times. If the answer is yes, the method moves to step S210, wherein the digital asset is given the highest possible ranking, e.g., 1001, and is indicated as pinned for a predetermined rental period. The method then moves back to the combination of steps S200 and S202 for consideration of the next digital asset.

If the answer in step S208 is no, the method moves to step S212, wherein it is determined if the digital asset has recently been or is being browsed ("B") by the user. It is to be remembered that a digital asset may previously have been received and cached as a rented, browsed, favorite or standard digital asset, and may be browsed plural times. If the answer is yes, the method moves to step S214, wherein the digital asset is given the highest possible ranking, e.g., 1001, and is indicated as pinned for a predetermined browsing period. The method then moves back to the combination of steps S200 and S202 for consideration of the next digital asset.

If the answer in step S212 is no, the method moves to step S216, wherein it is determined if the digital asset has been designated as a Favorite ("F") by the user. It is to be remembered that a digital asset may previously have been received and cached as a rented, browsed, favorite or standard digital asset, and may be designated as a Favorite plural times. If the answer is yes, the method moves to step S218, wherein the digital asset is given a medium high ranking, e.g., 800. The method then moves back to the combination of steps S200 and S202 for consideration of the next digital asset.

If the answer in step S216 is no, then the new digital asset receives no special status, and is given a set ranking, e.g., 500, by the method or server, in step S220.

At this point, the method then decreases the ranking of any unpinned digital asset in dependence on how long the digital asset has been cached and, advantageously, the circumstances under which the digital asset was received. For example, as discussed above, a digital asset received from the provider without a request from the user may drop in ranking faster than a digital asset received in response to a request from the user, under the assumption that if the user was sufficiently interested in a digital asset to specifically request it, he is more likely to buy or rent it given a little more time.

In the advantageous example of FIG. 5, in accordance with the exemplary equations given on page 30 of this specification, in step S222, the value of the constant $k_1$ or $k_2$ may be determined, and then the new ranking may be calculated at step S224.

Then, either in dependence on the ranking or for another appropriate reason, the method of FIG. 5 determines in step S226 whether to delete the digital asset under consideration. Alternatively, the method could wait until all the cached digital assets have bee re-ranked, and then could delete the selected digital assets all at once. The method then moves back to the combination of steps S200 and S202 for consideration of the next digital asset.

At any time that the method determines that all relevant digital assets have been re-ranked/deleted, the method then moves back to the combination of steps S200 and S202.

It will be understood, as noted above, that all of the above-discussed variations of the methods of FIGS. 4 and 5, as well as any currently known and unknown equivalents thereof, are considered to be within the scope of the present invention and to be disclosed herein. Moreover, all of the numerous factors, options and considerations discussed throughout the specification shall be considered as being within the scope of the present invention and to be usable in or in conjunction with the methods of FIGS. 4 and 5.

Although the present invention has been described above most often in terms of method features, the present invention is not limited to methods or method features. For example, the scope of the present invention includes a signal containing executable instructions for causing a programmable electronic circuit to perform the method features described above. As another example, the scope of the present invention also includes a storage medium storing any such signal.

The scope of the present invention also includes apparatus for accomplishing the features and functions described above. For example, one preferred embodiment of an apparatus within the scope of the present invention includes a receiver for receiving a digital asset intended for local storage in a storage device that has been pushed down from a transmitter, the storage device having a finite capacity storage space for storing digital assets, and a processor for assigning a rank order to each digital asset stored or to be stored in the storage device, said processor repeatedly examining the assigned rank orders of one or more of the digital assets stored in the storage device and selectively deleting a digital asset having a rank order that is lowest among the examined rank orders, wherein each rank order is assignable based on predefined default ranking rules and user instructions pertaining to one or more of the digital assets that are capable of causing a deviation from the default ranking rules.

Such an apparatus may further comprise the storage device for storing one or more digital assets received by the receiver.

The above description of a new and highly effective cache system has many advantages over conventional systems. The provider of digital assets can make each individual digital asset available to selected (e.g., registered) users under conditions that make it cost effective for the provider and easy to use for the user. While most of the above discussion has related to a PUSH DOWN system wherein the provider determines which digital assets are provided and under what conditions, the novel and advantageous system has also been described as operable under a PULL DOWN system wherein the user may request certain digital assets and, possibly, some of the conditions under which the content is provided. DRM rights are secured, while at the same time the user is given increased flexibility both in accessing those programs or files that he is most interested in and in avoiding those programs in which he has no interest.

It will, of course, be apparent to those of skill in this art that many modifications and changes may be made in the above-described embodiments without departing from the scope of the invention. Therefore, reference should be made to the following claims for a fuller determination of that scope.

I claim:

1. A method for managing the storage of digital assets in a storage device comprising the steps of:
   (a) receiving a digital asset intended for local storage in a storage device that has been pushed down from a source, the storage device having a finite capacity storage space for storing digital assets,
   (b) assigning a rank order to each received digital asset stored in the storage device, and
   (c) repeatedly examining the assigned rank orders of one or more of the digital assets stored in the storage device and selectively deleting a digital asset having a rank order that is lowest among the examined rank orders,
   wherein each rank order is assignable based on predefined default ranking rules and user instructions pertaining to one or more of the digital assets that are capable of causing a deviation from the default ranking rules, and
   wherein the default ranking rules comprise one or more of the following:
      (c1) refraining from deleting a digital asset currently being rented;
      (c2) refraining from deleting a digital asset currently being used;
      (c3) reducing a ranking order of a digital asset based on a duration during which the respective digital asset has been stored in the storage device;
      (c4) ranking a digital asset as being in a group of digital assets last to be deleted amongst deletable digital assets responsive to a user indication that the respective digital asset is a user's favorite;
      (c5) reducing a ranking order of a digital asset by a smaller amount than other digital assets whose rank is reduced if the respective digital asset was pulled down but not used, and
      (c6) refraining from deleting a digital asset that has been purchased,
   the method further comprising the following steps:
   (d) initially assigning a default numerical rank RANK as indicated by a source of a digital asset, wherein a larger value of RANK has a higher ranking order, and wherein delete-able digital assets are deleted in order of lowest numerical rank,
   (e) if the respective digital asset is purchased, increasing the value of RANK to a default highest permissible value,
   (f) if the respective digital asset is rented for a certain rental time period, increasing the value of RANK to the default highest permissible value until the expiration of the rental period;
   (g) if the user has browsed the respective digital asset, then increasing the value of RANK to the default highest permissible value for a certain period of time following the browsing of the respective asset.

2. The method of claim 1 further comprising the step of:
   (d) enabling one or more uses of non-deleted digital assets by a user.

3. The method of claim 2 where the enabled uses include one or more of: presenting in a directory listing an indication of availability of at least part of a non-deleted digital asset for use, rendering at least a part of a non-deleted digital asset, executing at least a part of a non-deleted digital asset, modifying at least a part of a non-deleted digital asset, transferring at least a part of a non-deleted digital asset to another medium, and copying at least a part of a non-deleted digital asset.

4. The method of claim 1 wherein at least one of the digital assets includes one or more of an audio signal, a moving picture signal, text, executable code, and a still image.

5. The method of claim 1 wherein at least one digital asset is stored in compressed form, in a form secure from unauthorized use, or both.

6. The method of claim 5 wherein the storage in a form secure from unauthorized use comprises storage in encrypted form.

7. The method of claim 1 further comprising the step of:
   (d) pulling down at least one digital asset for storage at the storage device.

8. The method of claim 1 further comprising at least one of the following steps:
   (e) responsive to a user indication corresponding to a storage capacity of the finite capacity storage space, allocating a fraction of a total capacity of storage space of the storage device to be used for storing digital assets;
   (f) preventing access to the storage space allocated for storage of the digital assets by at least one other device or application;
   (g) using a local embedded file system for storing and retrieving each digital asset stored in the finite capacity storage space;
   (h) minimizing fragmentation of each digital asset stored within the finite capacity storage space;
   (i) for each received digital asset intended for local storage that is to be stored on the storage device, allocating a part of the finite capacity storage space for storing the received digital asset, if possible;
   (j) receiving an indication from a user to assign a rank ordering to a digital asset that prevents deletion of the digital asset;
   (k) receiving a new set of rules to be used in place of the predefined default rules for assigning rank order to a digital asset;
   (l) partitioning the finite capacity storage space into plural partitions, where each of the partitions is for storing a different type of digital asset;
   (m) allocating space in the finite capacity storage space for storing a particular digital asset, as that digital asset is received, so that the space for storing portions of the digital asset is allocated just in time relative to the receipt of each such portion of the digital asset;
   (n) only enabling use of a particular digital asset that accords with rights permitted for such digital asset;
   (o) pushing down the digital asset by multicast transmitting the digital asset; and
   (p) receiving at least one composite digital asset comprising a group of one or more component digital assets and zero or more metadata.

9. The method of claim 1 further comprising at least one of the following steps:
   (h1) responsive to a user indication that the respective digital asset is a user's favorite, increasing the value of RANK to a value that is less than the default highest permissible value;
   (h2) if the digital asset has already been used by the user then reducing the value of RANK for that respective digital asset by a certain reduction constant $k_1$;
   (h3) if the digital asset was pushed down by the source, then reducing the value of RANK for that respective digital asset according to the formula:

$$\text{RANK} := -\text{RANK} - \lfloor g/A \rfloor \times k_2$$

otherwise, reducing the value of RANK for that respective digital asset according to the formula:

$$RANK := RANK - \lfloor g/A \rfloor \times k_1$$

where:

A is the duration that the digital asset has been stored in the local storage device, g is a default maximum threshold storage duration $k_2$ is a certain reduction constant such that $k_2 > k_1$.

10. The method of claim 1 wherein rank orders are assigned to one or more digital assets according to at least one of the following events:

(1) after an elapse of each successive time period of a certain duration, all digital assets stored on the local storage device are ranked;

(2) assigning a rank order to a particular digital asset immediately preceding transmission of that respective digital asset from the source;

(3) assigning a rank order to a particular digital asset immediately upon completion of transmission of that particular digital asset;

(4) assigning a new rank order to a digital asset when it is purchased;

(5) assigning a new rank order to a digital asset when it is browsed; and (6) assigning a new rank order to a digital asset, responsive to a user indication that the respective digital asset is a user's favorite.

11. The method of claim 1 wherein the examination of the assigned rank orders of one or more of the digital assets and the selective deletion of a digital asset having a rank order that is lowest among the examined rank orders, comprises the following mutually exclusive alternative steps:

(d) if there is sufficient spare capacity in the finite capacity storage space for storing a new digital asset to be transmitted, then the new digital asset is stored without requiring deletion of the digital asset having a rank order that is lowest among the examined rank orders; or (e) if there is insufficient spare capacity in the finite capacity storage space for storing a digital asset to be transmitted, then deleting at least the digital asset having a rank order that is lowest among the examined rank orders.

12. The method of claim 1 further comprising the step of receiving a command from a user to configure the management of storage of digital assets including at least one of the following commands:

(d) a command for designating additional storage space for storing digital assets including an indication of a location of the additional storage space and a storage capacity of the additional storage space;

(e) a command for changing the storage capacity of the storage space of the local storage device for storing digital assets; and (f) a maximum storage duration threshold used for reducing the rank order of digital assets stored on the local storage device.

13. A storage medium storing a signal containing executable instructions for causing a programmable electronic circuit to perform the steps of claim 1.

14. An apparatus for performing the method of claim 1 comprising:

a receiver for receiving a digital asset intended for local storage in a storage device that has been pushed down from a transmitter, the storage device having a finite capacity storage space for storing digital assets, and a processor for assigning a rank order to each digital asset stored or to be stored in the storage device, said processor repeatedly examining the assigned rank orders of one or more of the digital assets stored in the storage device and selectively deleting a digital asset having a rank order that is lowest among the examined rank orders, wherein each rank order is assignable based on predefined default ranking rules and user instructions pertaining to one or more of the digital assets that are capable of causing a deviation from the default ranking rules.

15. The apparatus of claim 14 further comprising the storage device for storing one or more digital assets received by the receiver.

* * * * *

UNITED STATES PATENT AND TRADEMARK OFFICE
CERTIFICATE OF CORRECTION

PATENT NO.       : 7,680,993 B2
APPLICATION NO. : 11/644601
DATED            : March 16, 2010
INVENTOR(S)      : Dougall It is certified that error appears in the above-identified patent and that said Letters Patent is hereby corrected as shown below:

In Column 6, Line 16, delete "Director" and insert -- Director™ --, therefor.

In Column 6, Line 21, delete "SMR-25 or SMR-26" and insert -- SMR-25™ or SMR-26™ --, therefor.

In Column 6, Line 24, delete "Inc." and insert -- Inc.™. --, therefor.

In Column 7, Line 49, delete "10" and insert -- 110 --, therefor.

In Column 16, Line 62, delete "S1102," and insert -- S102, --, therefor.

In Column 17, Line 10, delete "S1100" and insert -- S100 --, therefor.

In Column 17, Line 11, delete "S1104" and insert -- S104 --, therefor.

In Column 21, Line 36, in Claim 1, delete "reduced" and insert -- reduced, --, therefor.

In Column 21, Line 37, in Claim 1, delete "used," and insert -- used; --, therefor.

In Column 21, Line 45, in Claim 1, delete "rank," and insert -- rank; --, therefor.

In Column 21, Line 48, in Claim 1, delete "value," and insert -- value; --, therefor.

In Column 22, Line 67, in Claim 9, delete "-RANK" and insert -- RANK --, therefor.

Signed and Sealed this

Second Day of November, 2010

David J. Kappos
*Director of the United States Patent and Trademark Office*